United States Patent
Asakawa

(10) Patent No.: US 6,508,939 B2
(45) Date of Patent: Jan. 21, 2003

(54) MIXED BED TYPE SUGAR SOLUTION REFINING SYSTEM AND REGENERATION METHOD FOR SUCH APPARATUS

(75) Inventor: Yuji Asakawa, Tokyo (JP)

(73) Assignee: Organo Corporation, Tokyo (JP)

(*) Notice: Subject to any disclaimer, the term of this patent is extended or adjusted under 35 U.S.C. 154(b) by 0 days.

(21) Appl. No.: 10/000,589

(22) Filed: Oct. 22, 2001

(65) Prior Publication Data

US 2002/0058715 A1 May 16, 2002

Related U.S. Application Data

(62) Division of application No. 09/740,594, filed on Dec. 19, 2000, now Pat. No. 6,362,240.

(30) Foreign Application Priority Data

Dec. 20, 1999 (JP) .............................. 11-360960

(51) Int. Cl.[7] .......................... B01J 49/02; B01J 43/00
(52) U.S. Cl. ...................... 210/675; 127/42; 127/53; 521/26; 210/660; 210/670; 210/661; 210/681
(58) Field of Search ................ 210/675, 670, 210/660, 661, 681; 127/42, 53; 521/26

(56) References Cited

U.S. PATENT DOCUMENTS

| | | | | |
|---|---|---|---|---|
| 3,073,725 A | * | 1/1963 | Popper | |
| 4,140,541 A | * | 2/1979 | Popper | 127/46 A |
| 4,968,353 A | * | 11/1990 | Kawasaki | 127/46.2 |
| 5,443,732 A | * | 8/1995 | Lahoda | 210/635 |
| 6,187,826 B1 | * | 2/2001 | Viscardi | 521/26 |

FOREIGN PATENT DOCUMENTS

TW         82102176        3/1993

OTHER PUBLICATIONS

Patent Gazette, Publication No. 31057, dated Jul. 1, 1980, one page.

Patent Gazette, Publication No. 39985, dated Nov. 1, 1981, two pages.

* cited by examiner

Primary Examiner—Fred Zitomer
(74) Attorney, Agent, or Firm—Rosenthal & Osha L.L.P.

(57) ABSTRACT

By passing an alkali regenerating agent A through a basic anion exchange resin (3), and through a strongly acidic cation exchange resin (4), the basic anion exchange resin can be regenerated while amphoteric organic materials such as the amino acids captured at the strongly acidic cation exchange resin can be desorbed. Then, an acid regenerating agent B is passed through the strongly acidic cation exchange resin to regenerate the strongly acidic cation exchange resin.

7 Claims, 3 Drawing Sheets

MIXED BED TYPE SUGAR SOLUTION REFINING SYSTEM AND REGENERATION METHOD FOR SUCH APPARATUS

This application is a divisional application of U.S. patent application Ser. No. 09/740,594, filed Dec. 19, 2000, U.S. Pat. No. 6,362,240.

BACKGROUND OF THE INVENTION

1. Field of the Invention

The present invention relates to a regeneration method for a sugar solution purification system for deionizing and decolorizing a sugar solution such as a starch sugar solution, and in particular to a regeneration method for ion exchange resins in a mixed-bed type sugar solution deionization system which uses a strongly acidic cation exchange resin and a basic anion exchange resin.

2. Description of the Related Art

When a starch is hydrolyzed by an acid or by an enzyme, various types of starch sugars (which refers to the sugars manufactured from starch as the raw material) are obtained depending on various hydrolysis conditions. The hydrolysis of starch can be divided into two steps, liquefaction and saccharification. A starch sugar solution can be obtained by starch saccharification, but the starch sugar solution contains some impurities. In order to remove these impurities, a starch sugar solution refining step is taken after the starch saccharification step.

When the starch sugar solution is refined, ion exchange processes are performed as a post-process following such refining steps as carbonation, granular active carbon filtration, and bone char filtration. The ion exchange processes include an ion exchange process for decolorizing and an ion exchange process for deionization.

The ion exchange process for deionization generally consists of two-bed type front deionization system which uses a strongly acidic cation exchange resin layer and a weakly basic anion exchange resin layer, and a mixed-bed type polishing deionization system which uses a strongly acidic cation exchange resin and a Type II strongly basic anion exchange resin. Most of the impurities such as the salts and color bodies are removed from the original solution at the front deionization system and the polishing deionization system effects final deionization, decolorization, and pH adjustment. The deionization process is widely used throughout the industry and is superior as a refining method for the sugar solution in that a high purity sugar solution can be obtained. This is attributed to superb performance of the polishing mixed-bed ion exchange system. In recent years, methods have been proposed in which a weakly basic anion exchange resin or a Type I strongly basic anion exchange resin is used in place of the Type II strongly basic anion exchange resin in the polishing mixed-bed ion exchange system.

Regeneration of ion exchange resins in the mixed-bed type sugar solution polishing deionization system using a strongly acidic cation exchange resin and a basic anion exchange resin is currently performed as follows. First, after the sugar solution has been passed through the mixed-bed ion exchange column to a certain endpoint, the strongly acidic cation exchange resin is separated to the lower layer and the basic anion exchange resin is separated to the upper layer within the mixed bed column. This separation of the two resins which are in mixed condition is achieved by backwash by dint of the relative density difference between the resins. An acid regenerating agent such as a hydrochloric acid solution is passed upward through the strongly acidic cation exchange resin at the lower layer to regenerate the strongly acidic cation exchange resin. Similarly, an alkali regenerating agent such as a sodium hydroxide solution is passed downward through the basic anion exchange resin at the upper layer to regenerate the basic anion exchange resin. While the regenerant is being passed through one of the two resin layers, countercurrent water is passed through the other resin layer, and both waste solution from resin regeneration and water are discharged from a collector provided at the separation boundary of the resins. There also exists a method for simultaneously passing the two regenerants through respective resin layers. After the completion of their regeneration, the resins are mixed to again form a mixed bed.

In the mixed-bed type sugar solution deionization system using a strongly acidic cation exchange resin and a basic anion exchange resin, with the conventional regenerating method of passing an acid regenerating agent through the strongly acidic cation exchange resin and an alkali regenerating agent through the basic anion exchange resin, there were some cases where, after a few cycles of regeneration step, the conductivity of the sugar solution treated by the mixed-bed increases. The inventors analyzed the salts contained within the treated sugar solution having a higher conductivity and concluded that there was a leakage of amphoteric organic materials such as amino acids from the mixed-bed system to the treated sugar solution.

SUMMARY OF THE INVENTION

One object of the present invention is to provide a regeneration method for a mixed-bed type sugar solution deionization system which can effectively prevent the increased conductivity of the treated sugar solution.

The inventors examined the cause of the leakage of amphoteric organic materials such as amino acids into the treated sugar solution, and concluded that, at the initial stage, the amphoteric organic materials such as amino acids in the sugar solution are adsorbed by both the strongly acidic cation exchange resin and the basic anion exchange resin, but because the ion adsorption capability of the basic anion exchange resin is weaker than that of the strongly acidic cation exchange resin and is weakened as the ion exchange deionization is repeated, the amphoteric organic materials such as amino acids in the sugar solution are eventually adsorbed by the strongly acidic cation exchange resin alone.

As described above, the amphoteric organic materials such as amino acids in the sugar solution are mostly adsorbed by the strongly acidic cation exchange resin. However, in the conventional regenerating method using an acid regenerating agent, the amphoteric organic materials tend not to desorbed from the strongly acidic cation exchange resin. The inventors suspect that this is due to the cation portion of the amphoteric organic materials such as the amino acids being adsorbed by the strongly acidic cation exchange resin when the amphoteric organic materials are adsorbed by the strongly acidic cation exchange resin. Because of this, passing of an acid regenerating agent such as hydrochloric acid will not cause the amphoteric organic materials themselves to be desorbed, and only the anion portion such as the carboxylic acid radical which was not captured is ion exchanged.

The inventors have thus examined various means for desorbing the amphoteric organic materials such as the amino acids from the strongly acidic cation exchange resin, and concluded that by passing an alkali regenerating agent such as sodium hydroxide through the strongly acidic cation exchange resin, the amphoteric organic materials such as the amino acids can efficiently be desorbed from the strongly acidic cation exchange resin. This is suspected to be due to desorption of the cation portion of the captured amphoteric organic materials such as the amino acids from the strong acidic cation exchange resin when the alkali regenerating agent contacts the strongly acidic cation exchange resin, causing the entire amphoteric organic materials to be desorbed.

The present invention is based on this discovery, and provides a regenerating method of a mixed-bed type sugar solution deionization system for regenerating ion exchange resins in the mixed-bed type sugar solution deionization system filled with a strongly acidic cation exchange resin and a basic anion exchange resin, comprising the steps of contacting an alkali regenerating agent with both the strongly acidic cation exchange resin and the basic anion exchange resin, and then contacting an acid regenerating agent with the strongly acidic cation exchange resin.

In the regenerating method of the present invention, by passing an alkali regenerating agent through both the strongly acidic cation exchange resin and the basic anion exchange resin, the basic anion exchange resin is regenerated while amphoteric organic materials such as the amino acids captured on the strongly acidic cation exchange resin are desorbed, and then, by passing an acid regenerating agent through the strongly acidic cation exchange resin, the cation exchange resin is regenerated, resulting in prevention of the leakage of amphoteric materials such as amino acids into the treated sugar solution and stabilization of the quality of the treated sugar solution.

DESCRIPTION OF THE PREFERRED EMBODIMENTS

Figure 1:
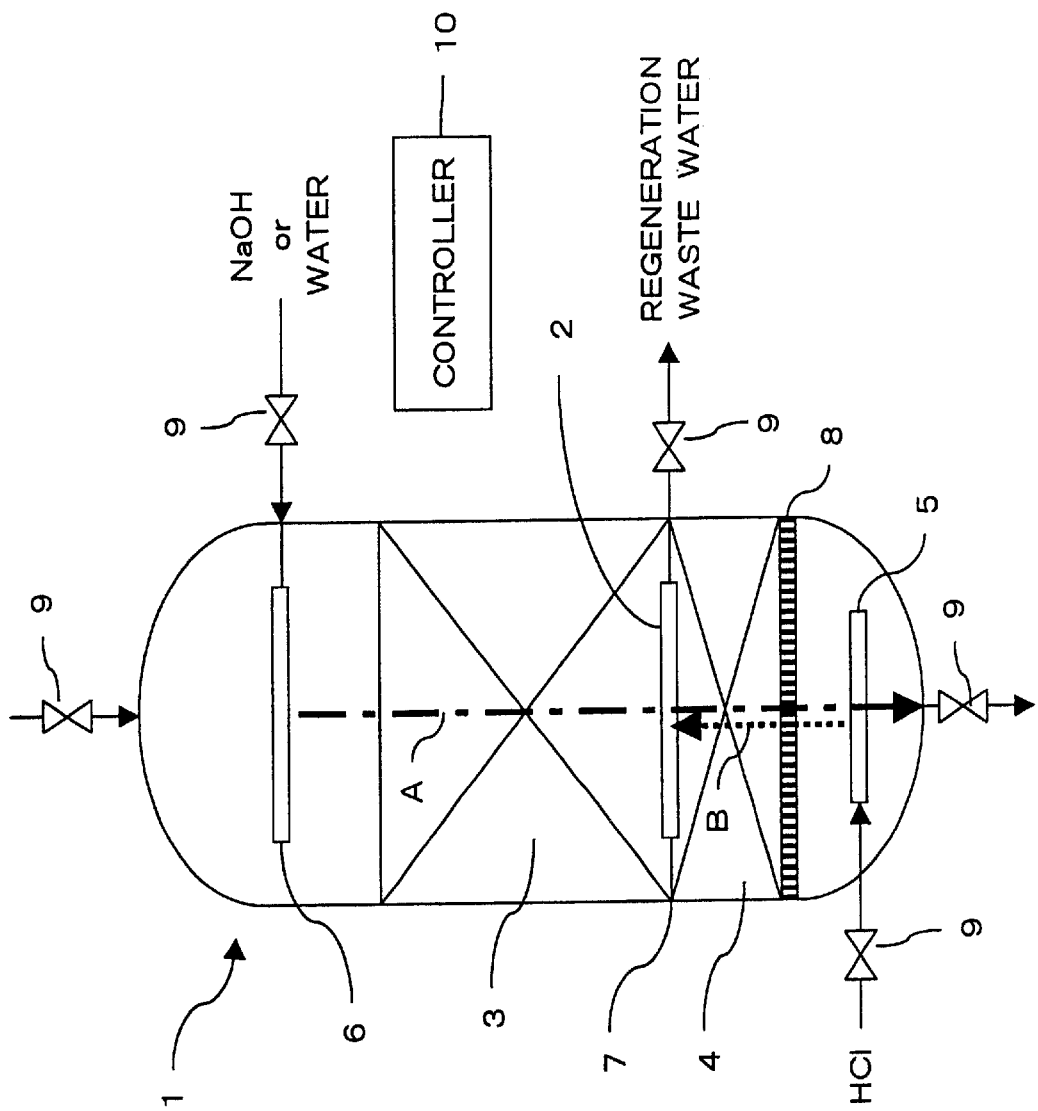
FIG. 1 is a schematic structural diagram showing an example of a mixed-bed type sugar solution deionization apparatus of the present invention.

The present invention will be described in more detail hereinafter. In the present invention, an alkali regenerating agent is first passed through both the strongly acidic cation exchange resin and the basic anion exchange resin. The alkali regenerating agent is preferably a sodium hydroxide solution, but any of the known types of alkali regenerating agent can be used. The alkali regenerating agent can either be passed through before or after the separation of the ion exchange resins. In particular, when a weakly basic anion exchange resin is used as the basic anion exchange resin, because the regeneration efficiency is high, the alkali regenerating agent can be passed through the ion exchange resins before they are separated.

In the present invention, an acid regenerating agent is then passed through the strongly acidic cation exchange resin. The acid regenerating agent is preferably a hydrochloric acid solution, but any of the known types of acid regenerating agent can be used. The acid regenerating agent is passed through the strongly acidic cation exchange resin after the ion exchange resins are separated.

The present invention can be applied to any of the known types of strongly acidic cation exchange resins and basic anion exchange resins for a mixed-bed type sugar solution deionization system, and the types of the ion exchange resins can be selected to satisfy other needs such as the objective of the ion exchange treatment. Examples of such ion exchange resins include strongly acidic cation exchange resins such as AMBERLITE 200CT, AMBERLITE IR120B, AMBERLITE IR124, AMBERLITE IR118, DIAION SK1B, DIAION SK102, DIAION PK208, and DIAION PK212 (all of which are trademarked), weakly basic anion exchange resins such as AMBERLITE XE583, AMBERLITE IRA67, AMBERLITE IRA96SB, DIAION WA10, DIAION WA20, and DIAION WA30 (all of which are trademarked), Type I strongly basic anion exchange resins such as AMBERLITE IRA402BL, AMBERLITE IRA400, AMBERLITE IRA440B, AMBERLITE XT5007, AMBERLITE IRA400, AMBERLITE IRA900, AMBERLITE IRA904, DIAION SA10A, DIAION SA11A, DIAION PA306, and DIAION PA308 (all of which are trademarked), and Type II strongly basic anion exchange resins such as AMBERLITE IRA411S, AMBERLITE IRA410, AMBERLITE IRA910, DIAION SA20, and DIAION PA418 (all of which are trademarked).

A mixed-bed type sugar solution deionization system to which the present invention is applicable is preferably a system where the mixed bed is formed with the ratio of total ion exchange capacity of the strongly acidic cation exchange resin to the total ion exchange capacity of the basic anion exchange resin between 4:1 to 1:4, in order to stabilize pH of the treated solution.

The regeneration method of the present invention can be applied to, although not limited to, the following mixed-bed type sugar solution deionization systems in (a) through (c).

(a) A sugar solution deionization system constructed by arranging, in the order described, a cation exchange system using a strongly acidic cation exchange resin, an anion exchange system using a weakly basic anion exchange resin, and a mixed-bed type sugar solution deionization system using a strong cation exchange resin and Type I or II strongly basic anion exchange resin.

(b) A sugar solution deionization system constructed by arranging, in the order described, a cation exchange system using a strongly acidic cation exchange resin and a mixed-bed type sugar solution deionization system using a strongly acidic cation exchange resin and a weakly basic anion exchange resin.

(c) A sugar solution deionization system constructed by arranging, in the order described, a cation exchange system using a strongly acidic cation exchange resin, a mixed-bed type sugar solution deionization system using a strongly acidic cation exchange resin and a weakly basic anion exchange resin, and a mixed-bed type sugar solution deionization system using a strongly acidic cation exchange resin and a Type I or II strongly basic anion exchange resin.

The regeneration method of the present invention is preferably used for, for example, regeneration in a mixed-bed type sugar solution deionization system for processing a starch sugar solution, but the usage is not limited to such a system and the method can also be used in any mixed-bed type sugar solution deionization systems.

FIG. 1 is a schematic structural diagram showing an example of a mixed-bed type sugar solution deionization system of the present invention. A support member 8 is provided at the lower section within an ion exchange column 1 and supports a mixed bed of a strongly acidic cation exchange resin and a basic anion exchange resin thereon. An upper distributor 6 is provided at the upper section of the ion exchange column 1 for supplying a regenerating agent. A lower distributor 5 is provided below the support member 8 of the ion exchange column 1 for supplying a regenerating agent.

When the ion exchange resins are regenerated, the strongly acidic cation exchange resin and the basic anion exchange resin are separated by dint of the difference in the relative density. In this manner, as shown in the figure, a basic anion exchange resin layer 3 is formed at the upper layer and a strongly acidic cation exchange resin layer 4 is formed at the lower layer. A collector 2 is provided at a position of the interface boundary surface 7 for discharging the regeneration waste solution.

In this example, the sugar solution to be treated is supplied from the top of the ion exchange resin column 1 and the treated sugar solution is discharged from the bottom of the ion exchange column 1. A valve is provided on each route for circulating liquids while process and regeneration are performed. The valves 9 are controlled by a controller 10 to control circulation of various liquids. A pump is provided in each route if necessary and is controlled to be driven in order to control the circulation of desired liquid.

An example procedure for carrying out the regeneration in a mixed-bed type sugar solution deionization system using the regeneration method according to the present invention is as follows.

(1) After completing the sugar solution deionization step, the strongly acidic cation exchange resin 4 is separated to the lower layer and the basic anion exchange resin 3 is separated to the upper layer within the mixed bed column. The separation of the two resins is achieved by backwash by dint of the relative density difference between the resins. The backwash is achieved by flowing water in a reverse direction from the direction normally used.

Figure 2:
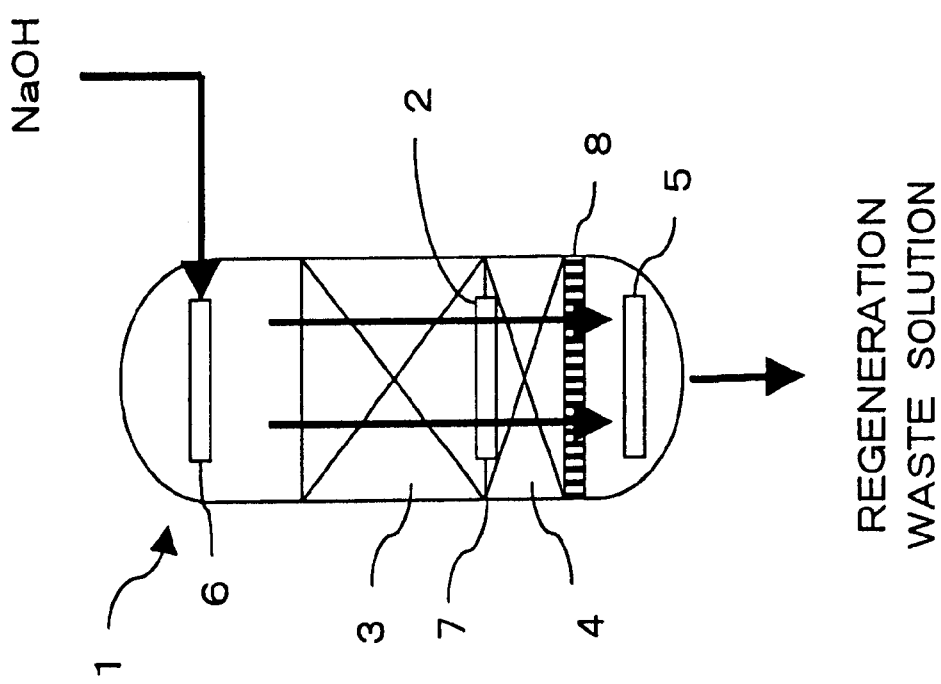
FIG. 2 is a diagram showing the condition when the regeneration is carried out with an alkali regenerating agent.

(2) An alkali regenerating agent such as a sodium hydroxide solution is passed through the strongly basic anion exchange resin 3 at the upper layer and through the strongly acidic cation exchange resin 4 at the lower layer from the upper distributor 6 in the downward direction. The flow of the alkali regeneration agent is shown by a dotted line A in FIG. 1, and the condition of the system when the alkali regeneration agent is passed through is shown in FIG. 2. In this manner, the basic anion exchange resin 3 is regenerated while amphoteric organic materials such as the amino acids are desorbed from the strongly acidic cation exchange resin 4. Then, the alkali regenerating agent is forced out by water and the resin layers are washed if necessary.

Figure 3:
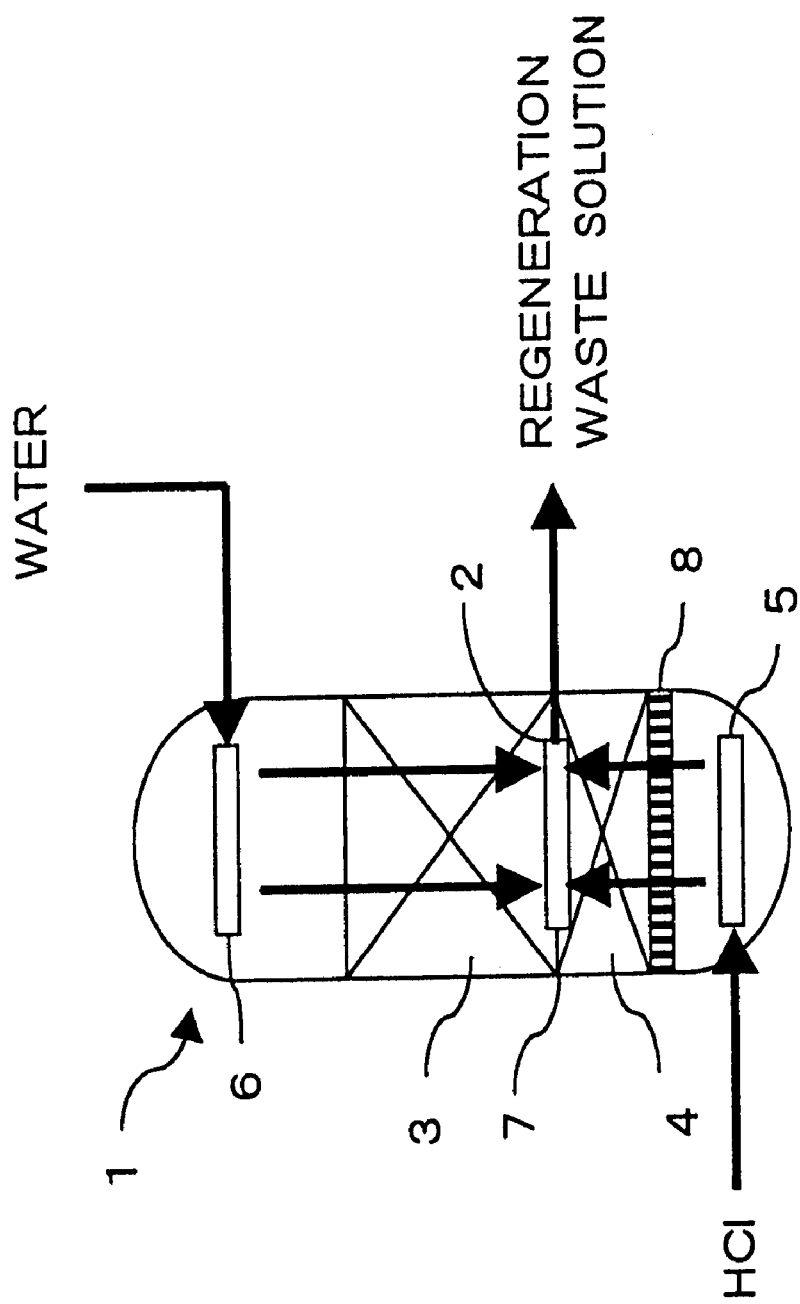
FIG. 3 is a diagram showing the condition when the regeneration is carried out with an acid regenerating agent.

(3) An acid regenerating agent such as a hydrochloric acid solution is passed through the strongly acidic cation exchange resin 4 at the lower layer from the lower distributor in the upward direction. At the same time, water is passed through the strongly basic anion exchange resin 3 at the upper layer in the downward direction. The resin regeneration waste solution and water are then discharged from the collector 2. The flow of the acid regenerating agent is shown in FIG. 1 by a dotted line B and the condition of the system when the acid regenerating agent is passed through is shown in FIG. 3. In this manner, the strongly acidic cation exchange resin 4 is regenerated. The acid regenerating agent is then forced out by water and the resin layers are washed.

(4) The regenerated resins are mixed to again form a mixed bed.

The present invention will next be described in more detail using a concrete example, but the present invention is not limited to the example described below.

EXAMPLE

A sugar solution deionization system was constructed using a cation exchange system filled with 0.6 L of a strongly acidic cation exchange resin (AMBERLITE 120B) and a mixed-bed type sugar solution purification system filled with 0.4 L of strongly acidic cation exchange resin (AMBERLITE 120B) and 1.5 L of weakly basic anion exchange resin (AMBERLITE XE583). In this case, the cation exchange system was provided upstream and the mixed-bed type sugar solution purification apparatus was provided downstream.

After carrying out a few cycles of sugar solution deionization/regeneration using the sugar solution deionization system described above, the ion exchange resins in each of the ion exchange systems were regenerated. In the regeneration of the upstream cation exchange system, the strongly acidic cation exchange resin was backwashed by water and then 1.2 L of 1 N hydrochloric acid solution was passed through the resin. The resin was then washed by deionized water and the regeneration steps were completed.

The regeneration of the downstream mixed-bed type sugar solution deionization system was carried out as follows. First, the resin layers were expanded by 150% by upward backwash water, and the strongly acidic cation exchange resin was separated to the lower layer and the weakly basic anion exchange resin was separated to the upper layer. Then, 2.4 L of 1 N sodium hydroxide solution was passed through both resins from the top of the system in the downward direction, in order to regenerate the weakly basic anion exchange resin at the upper layer and to desorb the amphoteric organic materials such as the amino acids from the strongly acidic cation exchange resin at the lower layer. After forcing the sodium hydroxide solution out with water, 0.9 L of 1 N hydrochloric acid solution was passed through the strongly acidic cation exchange resin at the lower layer from the bottom of the system in the upward direction, while water was passed through the weakly basic anion exchange resin at the upper layer from the top of the system in the downward direction. At the same time, the resin regeneration waste solution and the water are discharged from the collector provided at the interface between the two resins. The strongly acidic cation exchange resin at the lower layer was thus regenerated. Washing water was passed through the weakly basic anion exchange resin at the upper layer and the strongly acidic cation exchange resin at the lower layer from the top and bottom of the apparatus, respectively. The washing water was then discharged from the collector, and the regeneration process was completed.

After forming a mixed bed by mixing the regenerated strongly acidic cation exchange resin and the regenerated weakly basic anion exchange resin, a deionization process of a starch sugar solution was performed. At the deionization process, the sugar solution was passed through for five cycles, one cycle containing 60 L. The property of the original starch sugar solution is shown in Table 1. The property of the processed starch sugar solution obtained by processing 30 L of the original sugar solution at the fifth cycle is also shown in Table 1.

Comparative Example

A sugar solution deionization system similar to the above example was prepared. After a few cycles of sugar solution deionization processes were performed using the sugar solution deionization system, the ion exchange resins of each of the ion exchange systems were regenerated. The regeneration in the upstream cation exchange apparatus was carried out in the similar manner as the above example.

The regeneration of the downstream mixed-bed type sugar solution deionization system was carried out as follows. First, the resin layers were expanded by 150% by upward backwash water, and the strongly acidic cation exchange resin was separated to the lower layer and the weakly basic anion exchange resin was separated to the upper layer. Then, 2.4 L of 1 N sodium hydroxide solution was passed through the weakly basic anion exchange resin at the upper layer from the top of the apparatus in the downward direction while water was passed through the strongly acidic cation exchange resin at the lower layer from the bottom of the apparatus in the upward direction. At the same time, the resin regeneration waste solution and water were discharged from the collector provided at the interface between the two resins. The weakly basic anion exchange resin at the upper layer was thus regenerated. The regeneration of the strongly acidic cation exchange resin at the lower layer and the washing of the two resins were performed similar to the above example, and the regeneration processes were completed.

After forming a mixed bed by mixing the regenerated strongly acidic cation exchange resin and the regenerated weakly basic anion exchange resin, a deionization process of a starch sugar solution was carried out. The deionization system was operated under the same condition as in the above example. The property of the treated sugar solution obtained by processing 30 L of the original sugar solution at the fifth cycle of passing through the solution is shown in Table 1.

TABLE 1

| ANALYTICAL ITEM | Original Sugar Solution | Example 1 | Comparative Example 1 |
|---|---|---|---|
| Bx (%) | 46.0 | 45.8 | 45.8 |
| Amino Nitrogen Concentration (mgN/L) | 50 | <5 | 20 |
| pH | 4.51 | 5.65 | 6.45 |
| Electrical Conductivity ($\mu$s/cm) | 165 | 0.44 | 1.25 |

As apparent from Table 1, the example in which the regeneration process was carried out according to the regeneration method of the present invention gave less amount of amino acid leakage to the treated sugar solution compared with the comparative example in which the regeneration was performed according to the conventional method, and thus, the example shows stabilized property of the treated sugar solution. Therefore, according to the present invention, amphoteric organic materials such as the amino acids can be effectively desorbed from the strongly acidic cation exchange resin.

As described, according to the regeneration method of the present invention for a mixed-bed type sugar solution deionization system, the amphoteric organic materials such as the amino acids captured by the strongly acidic cation exchange resin of the mixed resins can efficiently be desorbed from the strongly acidic cation exchange resin. In this manner, the leakage of the amphoteric organic materials to the treated sugar solution can be prevented, thereby stabilizing the quality of the treated sugar solution.

What is claimed is:

1. A sugar solution deionization system, comprising:
    an ion exchange column arranged so as to allow the sugar solution to pass therethrough, the ion exchange column comprising:
        a strongly acidic cation exchange resin; and
        a basic anion exchange resin;
    a first port connected adjacent to the basic anion ion exchange resin;
    a second port connected adjacent to the strongly acidic cation exchange resin;
    a third port, disposed proximal to an interface layer formed by the strongly acidic cation resin and the basic anion exchange resin;
    a controller, operatively connected to at least the first port and the second port, and arranged to control at least the flow of an alkali regenerating agent and an acid regenerating agent through said first port and said second port, such that said alkali regenerating agent is provided through said first port and first comes in contact with said basic anion exchange resin and then contacts said strongly acidic cation exchange resin, and said acid regenerating agent is provided through said second port and first comes in contact with said strongly acidic cation exchange resin.

2. An apparatus of claim 1, further comprising a collector provided at a position corresponding to the interface between said strongly acidic cation exchange resin and said basic anion exchange resin, wherein regeneration waste solution of said acid regenerating agent which has passed through said strongly acidic cation exchange resin is discharged from said collector.

3. An apparatus of claim 2, wherein
    water is passed through said basic anion exchange resin when said acid regenerating agent is passed through said strongly acidic cation exchange resin, and
    water which passed through said basic anion exchange resin is discharged from said collector, along with regeneration waste solution of said acid regenerating agent.

4. An apparatus of claim 1, wherein a sodium hydroxide solution is used as said alkali regenerating agent.

5. An apparatus of claim 1, wherein said basic anion exchange resin is a weakly basic anion exchange resin.

6. An apparatus of claim 1, wherein a ratio of a total ion exchange capacity of said strongly acidic cation exchange resin to a total ion exchange capacity of said basic anion exchange resin in a range between 4:1 to 1:4.

7. An apparatus of claim 1, wherein said sugar solution is a starch sugar solution.

* * * * *